3,660,386
PYRIMIDINE DYESTUFFS

Jakob Benz, Oberwil, Basel-Land, and August Schweizer, Muttenz, Basel-Land, Switzerland, assignors to Sandoz Ltd. (also known as Sandoz AG), Basel, Switzerland
No Drawing. Continuation-in-part of application Ser. No. 629,120, Apr. 7, 1967, which is a division of application Ser. No. 588,630, Oct. 21, 1966, which in turn is a continuation of application Ser. No. 813,681, May 18, 1959. This application Oct. 9, 1969, Ser. No. 865,214
Claims priority, application Switzerland, May 28, 1958, 59,953/58
Int. Cl. C07f 1/08; C09b 47/04
U.S. Cl. 260—242         7 Claims

ABSTRACT OF THE DISCLOSURE

Water-soluble phthalocyanine dyestuffs containing sulfonic acid and/or sulfonic acid amide group and at least one trihalopyrimidylamino group bound to a carbon atom of a sulfonic acid alkylamide or arylamide group.

---

The present application is a continuation-in-part application of the divisional application Ser. No. 629,120, filed on Apr. 7, 1967 whch is a division of application Ser. No. 588,630, filed on Oct. 21, 1966 which in turn is a streamlined continuation of application Ser. No. 813,681, filed May 18, 1959, all abandoned.

It is known that water-solvent dyestuffs which contain at least one exchangeable hydrogen atom can be reacted in aqueous solution with six-membered triazine compounds containing two or three exchangeable halogen atoms bound to carbon atoms. Depending upon the di- or trihalotriazine chosen and the conditions of reaction, 1 or 2 halogen atoms of the triazine can be exchanged for radicals of the dyestuff molecule. It is also known that the remaining halogen atoms can be further reacted with compounds containing hydroxyl or amino groups, e.g. ammonia, methylamine, aniline, phenol or cellulose.

It has now been found that valuable new pyrimidine dyestuffs are obtained when water-soluble organic phthalocyanine dyestuffs containing at least one optionally monosubstituted amino group in the molecule are reacted with 2,4,5,6 - tetrahalopyrimidine in such a manner that the reaction product contains at least one trihalopyrimidyl radical.

The preferred 2,4,5,6-tetrahalopyrimidines are 2,4,5,6-tetrachloropyrimidine and 2,4,5,6 - tetrabromopyrimidine. The optionally monosubstituted amino group is an amino group which may be monosubstituted by alkyl, hydroxyalkyl, alkoxyalkyl and halogenalkyl radicals. The amino group or groups can be directly bound to aromatic nuclei of the dyestuff molecule or indirectly attached to the dyestuff molecule over an aliphatic chain and if desired a bridge member. Noteworthy aliphatic chains are e.g. —CH$_2$—, —CH$_2$—CH$_2$—, —CH$_2$—CH$_2$—CH$_2$—,

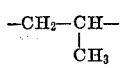

and —CH$_2$—CH$_2$—CH$_2$—CH$_2$—. Representative bridge members are e.g. —SO$_2$—, —CO—, —O—,

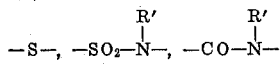

—NH—CO—NH—, —NH—COO— or

in which R' stands for hydrogen, low molecular alkyl or hydroxyalkyl, cycloalkyl, aryl or aralkyl, and R" stands for an acyl radical.

The aminophthalocyanine dyestuffs which are reacted with 2,4,5,6 - tetrahalopyrimidine may have, for example the following general formula:

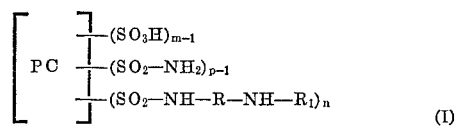

(I)

wherein

PC represents the radical of a phthalocyanine e.g. of copper phthalocyanine,
R represents an aliphatic, cycloaliphatic or aromatic divalent radical,
R$_1$ represents hydrogen or lower alkyl, e.g. methyl, ethyl or propyl,
$n$ is 1 or 2,
$m$ is 1 to 4,
$p$ is 1 to 4,
the sum $m+p$ is 3 to 5, and
the sum $m+p+n$ is 5 to 6.

These aminophthalocyanine dyestuffs are obtained according to the known methods by the reaction of phthalocyanines containing sulfonic acid chloride groups in the 3 or 4 positions of the benzene nuclei with suitable aliphatic, cycloaliphatic or aromatic diamines or with aliphatic, cycloaliphatic or aromatic monoamines which contain a substituent capable of conversion into the amino group. In the majority of cases the yield consists of a mixture of products at various stages of condensation.

The reaction with 2,4,5,6 - tetrahalopyrimidine of the water-soluble dyestuffs used as starting materials is conducted preferably in aqueous medium. The halide can be applied in concentrated form or dissolved in an organic solvent. Solvents specially suitable for halopyrimidines are acetone, benzene, chlorobenzene and toluene.

The temperature of reaction is governed by the reactivity of the individual starting materials and may vary e.g. between 20° and 100° C. If the temperatures higher than about 40° C. are necessary, it is advisable in view of the volatility of halopyrimidines in water-stream to work with vessels fitted with reflux condensers.

The reaction is carried out in a weakly alkaline, neutral or weakly acid medium, preferably in the pH range of 9 to 3. To neutralize the hydrogen halide so formed an acid-binding agent, e.g. sodium acetate, is added to the reaction solution at start of the operation, or, if preferred, small portions of sodium or potassium carbonate or sodium or potassium bicarbonate in solid powdered form or as a concentrated aqueous solution are added in the course of the reaction. Aqueous solutions of sodium or potassium hydroxide are other suitable neutralizing agent. The additions of small amounts of a wetting or emulsifying agent to the reaction mixture can accelerate the rate of reaction.

The reaction is so controlled that only one halogen atom of the 2,4,5,6-tetrahalopyrimidine reacts with an exchangeable hydrogen atom. Hitherto it has not been possible to determine which of the halogen atoms participates in the reaction or wether it is equally probable that any one of the isomeric forms will be formed. But since according to Childress and McKee (Journal of the American Chemical Society, 72, p. 4271 (1950)) the chlorine atom in 5-position is not reactive and since the positions 4 and 6 are equivalent, the trihalopyrimidyl group corresponds to the formula

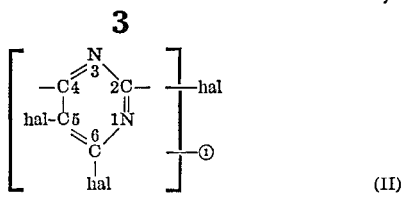

and is bound to the amino group of the dyestuff molecule through the linkage ①.

On completion of condensation, the pyrimidine dyestuff is precipitated from the solution or suspension, which may be previously neutralized, with sodium or potassium chloride or with acid, whereupon it is filtered with suction, washed and dried.

The water-soluble dyestuffs of the invention, which contain at least one trihalopyrimidyl group are suitable for the dyeing, padding and printing of fibers of animal origin, e.g. wool and silk, for synthetic polyamide fibers, e.g. nylon, of leather, of cellulose fibers, e.g. cotton, linen, and of regenerated cellulose fibers, e.g. viscose and cuprammonium rayon, as well as for mixtures of these fibers and materials in other forms. The optimum conditions of application vary depending on the type of fiber and the dyestuffs used.

The dyestuffs are dyed, padded, printed or fixed on cellulose fibers preferably in an alkaline medium, e.g. in presence of sodium carbonate or bicarbonate, sodium or potassium hydroxide solution, sodium metasilicate, sodium borate, trisodium phosphate, ammonia, etc. It is often an advantage to add a mild oxidizing agent such as sodium 1-nitrobenzene-3-sulfonate to the dyebath padding liquor or printing paste, in order to preclude reduction effects. Normally, the dyestuffs are fixed on cellulosic fibers by heat treatment.

The dyeings and prints on cellulose fibers are notable for their very good fastness to light, rubbing and dry cleaning and especially for their excellent fastness to wet agencies (washing, peroxide washing, perspiration, water and sea water), which is due to the formation of a stable chemical linkage between the dyestuff molecule and the cellulose molecule. Often the total amount of dyestuff applied does not take part in the reaction with the fiber and in such cases the unreacted dyestuff is removed from the fiber by suitable aftertreatments, e.g. washing and/or soaping, if necessary at higher temperatures. For this purpose synthetic detergents can be used, e.g. alkylarylsulfonates such as sodium dodecylbenzenesulfonate, alkyl sulfates or alkylpolyglycolether sulfates such as sodium lauryl sulfate, sodium lauryl polyglycol ether sulfate and monoalkylphenyl- and dialkylphenylpolyglycol ethers.

Animal and synthetic polyamide fibers are dyes and printed, or fixed, preferably in an acid, neutral or weakly alkaline medium, e.g. in presence of acetic, formic or sulfuric acid, ammonium sulfate, sodium metaphosphate, etc. Dyeing can also be carried out in an acetic acid to neutral medium in presence of levelling agents, e.g. polyoxethylated fatty amines or mixtures of the same and alkylpolyglycol ethers, the bath being adjusted to a weakly alkaline reaction on completion of dyeing with small amounts of an agent of alkaline reaction, e.g. ammonia, sodium bicarbonate or carbonate etc. or of compounds with react alkaline on heating, e.g. hexamethylene tetramine or urea. This is followed by thorough rinsing and acidifying with a little acetic acid if necessary.

In the dyeng and printing of fibers and other materials of animal origin and synthetic polyamides the linkage between the dyestuff molecule and the fiber is often less pronounced, due to the fact that some of the dyestuffs owing to their acidic character possess affinity for the fiber.

In the following examples the parts and percentages are by weight and the temperatures in degrees centigrade.

EXAMPLE 1

57.6 parts of copper phthalocyanine are added to 270 parts of chlorosulfonic acid and the solution heated at 140–145° for 3 hours. On cooling to room temperature it is poured into a mixture of ice and water. The precipitate is filtered off at 0° and washed with ice-cold diluted hydrochloric acid. The presscake is stirred into 300 parts of ice and 300 parts of water and the pH value brought to 5.0 by addition of dilute sodium hydroxide solution. Subsequently 15 parts of 1-amino-4-acetylaminobenzene are strewn in and the solution heated slowly to 45–50° with dilute sodium hydroxide solution added to give a constant pH value of 5.0–5.5. After 3 hours the solution is made weakly alkaline by the addition of sodium hydroxide and heated at 80° for 1 hour. At this temperature 200 parts of 30% hydrochloric acid are added and the mixture is maintained at 70–80° until the acetyl group is completely split off. The precipitated free amino compound is filtered off and washed with dilute hydrochloric acid. The filter cake is dissolved in 500 parts of warm water by the addition of a 30% sodium hydroxide solution. After the addition of 22 parts of 2,4,5,6-tetrachloropyrimidine the mixture is vigorously stirred for a few hours at 50–70° with reflux, a dilute sodium carbonate solution being added to maintain a constant neutral to weakly acid reaction. When the reaction has run its course the solution is treated for some time with animal charcoal to remove the small amount of unreacted tetrachloropyrimidine. After filtration, the dyestuff is salted out, filtered off and the presscake dried. On grinding it is obtained as a dark blue powder which dissolves in water to give turquoise solutions.

The dyestuff corresponds to the following formula

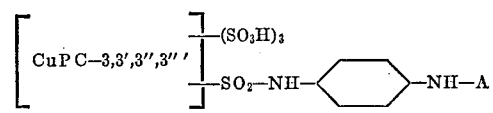

where A represents the trichloropyrimidyl radical (see Formula II).

Padding instructions

A mercerized cotton fabric is padded at 40° with a liquor containing 40 g./l. of calcined sodium carbonate, 20 g./l. of the dyestuff of this example, and 5 g./l. of sodium 1-nitrobenzene-3-sulfonate. The padding effect gives an increase of 80–100% on the dry weight. The fabric is conditioned in a chamber for 4 to 6 hours at 90–95° and at constant humidity then well rinsed in cold and warm water, soaped at the boil with 5 g./l. of soap for 15 minutes, rinsed again and dried. A greenish turquoise dyeing with good light and wet fastness is obtained.

EXAMPLE 2

Copper phthalocyanine-tetrasulfonic acid chloride (obtained according to the details given in Example 1) is stirred into 300 parts of water and 300 parts of ice. After the addition of 15 parts of finely powdered 1-amino-3-acetylaminobenzene the pH value of the suspension is brought to 8 and maintained at this level by adding 10% ammonia. The further operations (hydrolysis of the acetylamino group and reaction with 2,4,5,6-tetrachloropyrimidine) are carried out in the manner described in Example 1. The dyestuff corresponds to the formula

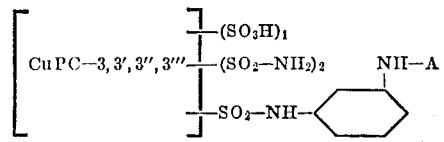

Printing instructions

A mercerized cotton fabric is printed with a printing paste of the following composition:

| | Parts |
|---|---|
| The above dyestuff | 30 |
| Urea | 100 |
| Water | 395 |
| 4% sodium alginate thickening | 450 |
| Sodium 3-nitrobenzenesulfonate | 10 |
| Calcined sodium carbonate | 15 |
| | 1000 |

The print is dried, then fixed by steaming for 15 minutes at 102–104°, rinsed with cold and with hot water, soaped at the boil for 15 minutes with an aqueous solution containing per liter 0.5 gram of a carboxymethylated alkylpolyglycol ether, rinsed again and dried. The so-obtained turquoise blue print is fast to light and to wet treatments (water, sea water, washing, peroxide washing and perspiration) and also to rubbing and dry cleaning.

EXAMPLE 3

By replacing in Example 1 the 15 parts of 1-amino-4-acetylaminobenzene by 16.2 parts of 1-amino-4-N-methyl-N-acetylaminobenzene, the following dyestuff is obtained.

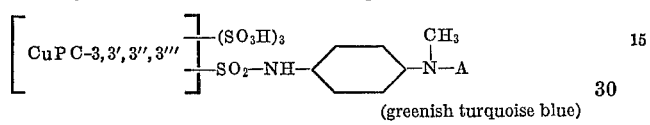

(greenish turquoise blue)

EXAMPLE 4

By replacing the 57.6 parts of copper phthalocyanine employed in Example 1 by 89.6 parts of copper phthalocyanine-4,4′,4″,4‴-tetrasulfonic acid the dyestuff of following formula is obtained

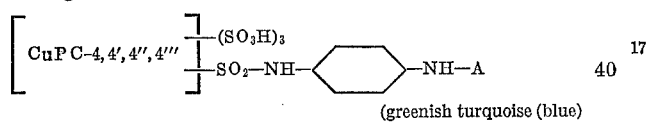

(greenish turquoise blue)

The following table contains formulae of further dyestuffs which are obtained according to the details of Examples 1 to 4. In this table, A represents the trichloropyrimidyl radical, B the tribromopyrimidyl radical (see Formula II and CuPC the copper phthalocyanine radical.

5
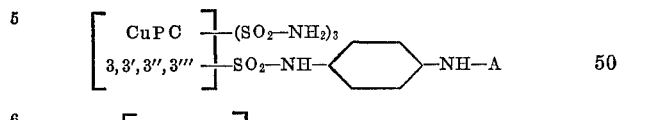

6
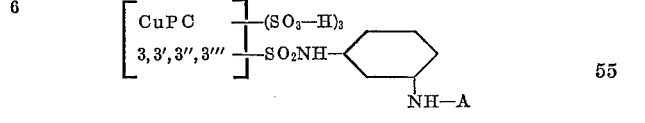

7
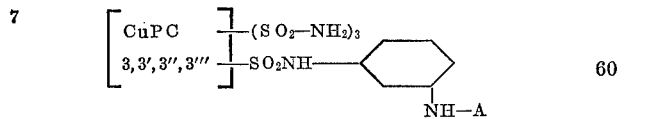

8
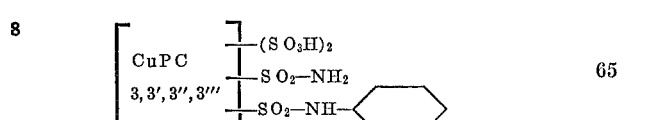

9
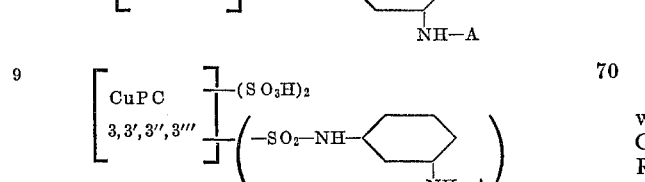

10
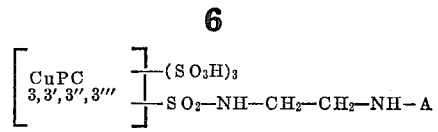

11
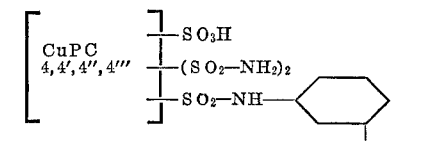

12
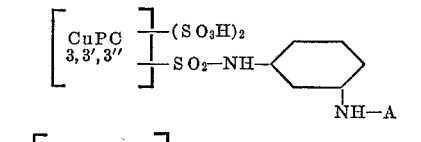

13
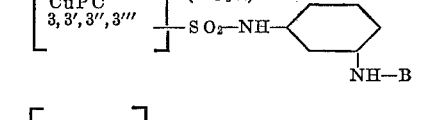

14
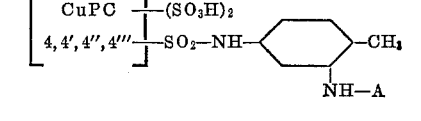

15
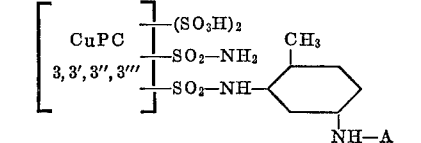

16
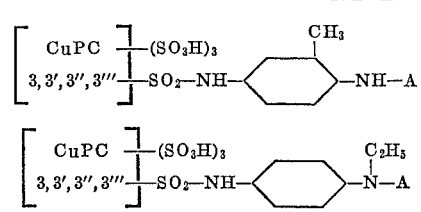

17
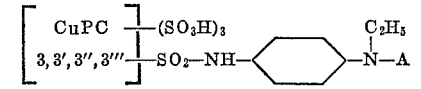

The dyeings or prints on cotton obtained with the dyestuffs Nos. 5–17 have the following shades.

| Dyestuff No.: | Shade |
|---|---|
| 5 | Greenish turquoise blue. |
| 6 | Turquoise blue. |
| 7 | Turquoise blue. |
| 8 | Turquoise blue. |
| 9 | Turquoise blue. |
| 10 | Turquoise blue. |
| 11 | Turquoise blue. |
| 12 | Turquoise blue. |
| 13 | Turquoise blue. |
| 14 | Turquoise blue. |
| 15 | Turquoise blue. |
| 16 | Greenish turquoise blue. |
| 17 | Greenish turquoise blue. |

Having thus disclosed the invention what we claim is:
1. A water-soluble organic dyestuff of the formula

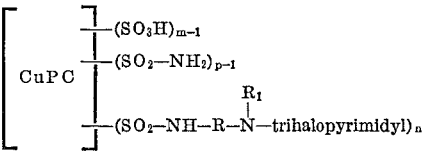

wherein
CuPC is copper phthalocyanine,
R is phenylene, tolylene or lower alkylene,
$R_1$ is hydrogen or lower alkyl, trihalopyrimidyl has the formula

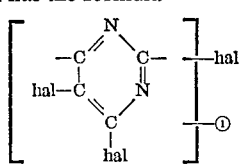

and is bound to the amino group

of the dyestuff molecule through the linkage ①,
hal is chlorine or bromine
$n$ is 1 or 2,
$m$ is 1 to 3,
$p$ is 1 to 3,
the sum $m+p$ is 3 to 5,
the sum $m+n+p$ is 5 to 6
and the substituents are bound to copper phthalocyanine in the 3- or 4-positions.

2. A water-soluble organic dyestuff according to claim 1 of the formula

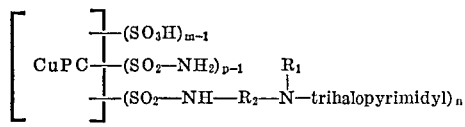

wherein
CuPC is copper phthalocyanine,
$R_2$ is phenylene, tolylene or lower alkylene,
$R_1$ is hydrogen or lower alkyl,
trihalopyrimidyl has the formula

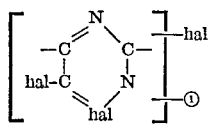

and is bound to the amino group

of the dyestuff molecule through the linkage ①,
hal is chlorine or bromine,
$n$ is 1 or 2,
$m$ is 1 to 3,
$p$ is 1 to 3,
the sum $m+p$ is 4 to 5, and
the sum $m+n+p$ is 5 to 6,
and the substituents are bound to the copper phthalocyanine in the 3- or 4-positions.

3. Water-soluble organic dyestuff according to claim 1 of the formula

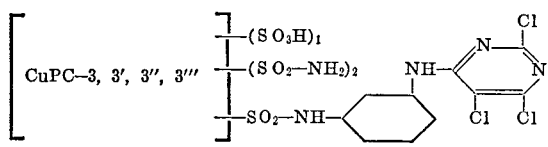

4. Water-soluble organic dyestuff according to claim 1 of the formula

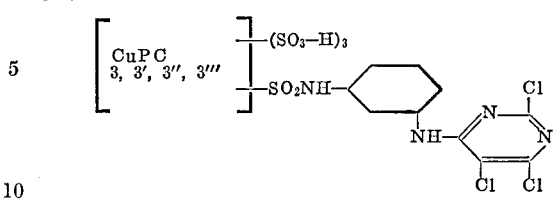

5. Water-soluble organic dyestuff according to claim 1 of the formula

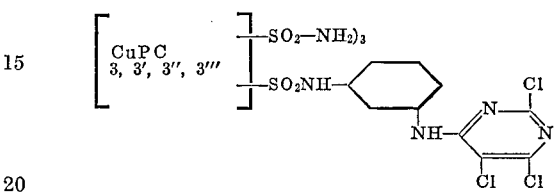

6. Water-soluble organic dyestuff according to claim 1 of the formula

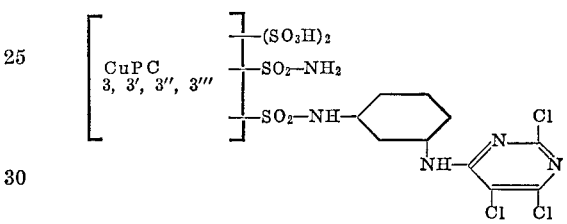

7. Water-soluble organic dyestuff according to claim 1 of the formula

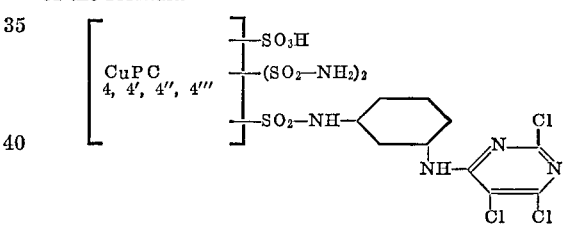

References Cited

UNITED STATES PATENTS

| | | | |
|---|---|---|---|
| 3,206,451 | 9/1965 | Benz et al. | 260—242 |
| 3,205,218 | 9/1965 | Weir et al. | 260—242 |
| 2,935,506 | 5/1960 | Heslop et al. | 260—242 |
| 3,116,293 | 12/1963 | Scalera et al. | 260—242 |
| 3,133,059 | 5/1964 | Clark et al. | 260—242 |

FOREIGN PATENTS

| | | | |
|---|---|---|---|
| 952,068 | 3/1964 | Great Britain | 260—242 |

OTHER REFERENCES

Langenbeck et al.: Chem. Abst. vol. 50, columns 4911–12 (1956) QD1. A51

NATALIE TROUSOF, Primary Examiner